United States Patent [19]

Dola et al.

[11] Patent Number: 4,952,163
[45] Date of Patent: Aug. 28, 1990

[54] OUTLET FOR SURFACE ACCESSIBLE WIRING

[75] Inventors: Frank P. Dola; Steven Feldman; John H. Lautherbach, all of Hudson; William G. Mengelson, Clearwater, all of Fla.

[73] Assignee: AMP Incorporated, Harrisburg, Pa.

[21] Appl. No.: 449,462

[22] Filed: Dec. 12, 1989

Related U.S. Application Data

[63] Continuation of Ser. No. 249,539, Sep. 26, 1988, abandoned.

[51] Int. Cl.$^5$ .............................................. H01R 25/16
[52] U.S. Cl. .................................... 439/211; 439/207; 174/48; 52/287
[58] Field of Search ................ 52/287; 174/48, 72 C, 174/97, 101; 361/334, 356, 357, 378; 439/113, 114, 120, 207–216

[56] References Cited

U.S. PATENT DOCUMENTS

| | | |
|---|---|---|
| 1,132,671 | 3/1915 | Murray . |
| 1,984,355 | 12/1934 | Abbott . |
| 2,156,633 | 5/1939 | La Ducer .............................. 174/48 |
| 2,904,991 | 9/1959 | Vaughan et al. . |
| 3,012,217 | 12/1961 | Pantin . |
| 3,061,810 | 10/1962 | Boyd ..................................... 339/22 |
| 3,195,698 | 7/1965 | Codrea ................................. 189/34 |
| 3,262,083 | 7/1966 | Gooding . |
| 3,377,756 | 4/1968 | Polhamus . |
| 3,404,706 | 10/1968 | D'Esopo .............................. 174/101 |
| 3,464,052 | 8/1969 | Hukin . |
| 3,464,177 | 9/1969 | Amato .................................. 52/287 |
| 3,529,389 | 9/1970 | Wilkins . |
| 3,589,083 | 6/1971 | Sclafani . |
| 3,592,956 | 7/1971 | Fork ..................................... 174/97 |
| 3,721,762 | 3/1973 | Gooding . |
| 3,814,833 | 6/1974 | Yamada et al. ....................... 174/48 |
| 4,038,796 | 8/1977 | Eckel ................................... 52/221 |
| 4,307,435 | 12/1981 | Ullman ................................ 439/210 |
| 4,308,418 | 12/1981 | Van Kuik et al. ..................... 174/48 |
| 4,313,646 | 2/1982 | Millhimes et al. ............. 339/156 R |
| 4,360,705 | 11/1982 | Rogers ................................ 174/48 |
| 4,443,654 | 4/1984 | Flachbarth et al. ................... 174/48 |
| 4,479,687 | 10/1984 | Humphreys et al. ................. 339/22 |
| 4,688,869 | 8/1987 | Kelly ................................... 439/209 |
| 4,808,768 | 2/1989 | Sireci .................................. 174/48 |

FOREIGN PATENT DOCUMENTS

| | | | |
|---|---|---|---|
| 976651 | 10/1975 | Canada ................................. | 174/48 |
| 2011229 | 2/1971 | Fed. Rep. of Germany ........ | 174/48 |
| 1039015 | 8/1966 | United Kingdom . | |
| 2031232 | 4/1980 | United Kingdom ................. | 174/48 |

OTHER PUBLICATIONS

AMP Products for the Office of the 80's . . . and Beyond, 1984.
AT Tri-Way, Total Surface Wiring System . . . Power, Data and/or Communications, 1986.
Architectural Aluminum by Wiremold, 6–86.
Croft and Summers, American Electrician's Handbook; 11th Ed. (McGraw-Hill 1987), pp. 9-67 to 9-83 and 9-162 to 9-167.
American Electric, FL Industries, Inc., brochure IBOCO brochure entitled Raceway-System.
Panduit brochure entitled Surface Raceway System.
Panduit brochure entitled Mod-Power, U.L. Listed, Surface System.
Walker brochure entitled Walkermold (TM).
Hubbell brochure entitled Polytrak (TM) Surface Non-metallic Raceways.
AT Power Systems brochure.
HKL Wireduct and Raceway catalog.
Commercial Industrial, Institutional Raceway Distribution Systems.

*Primary Examiner*—Gary F. Paumen
*Attorney, Agent, or Firm*—Robert W. Pitts

[57] ABSTRACT

A raceway assembly employing snap-on outlet covers is disclosed. The raceway has multiple compartments extending longitudinally for carrying conductors such as standard house wiring power conductors and telephone or data conductors. Separate outlet housings each comprise a one piece, generally metal, bracket having a front wall on a parallel back wall. Insulative end walls are secured to enclose the interior of the receptacle housings. The brackets have openings in the front wall and outlet conductors, such as duplex receptacles or modular telephone jacks, are secured to the front wall. Access to one compartment is provided by a cutout in the rear wall and the rear wall covers the entire portion of the other compartment. Brackets can be positioned side-by-side with multiple outlet connectors or receptacles being positioned on the same centerline.

27 Claims, 6 Drawing Sheets fig. 2

Fig. 6

OUTLET FOR SURFACE ACCESSIBLE WIRING

This application is a Continuation of Application Ser. No. 07/249,539 filed Sept. 26, 1988, now abandoned.

BACKGROUND OF THE INVENTION

1. Field of the Invention

This invention relates to a raceway assembly which can be employed with power conductors and telephone or data conductors and can be mounted either inlaid in a wall or along the surface of a wall or panel. More particularly this invention relates to a outlet or a receptacle housing which can be employed with a raceway containing a plurality of compartments, each compartment containing a unique set of wires, such as power, telephone or data conductors.

2. Description of the Prior Art

Surface raceway systems are generally unique and include a plurality of subsidiary separate components which must be assembled to form a completed assembly. Surface applied or mounted raceways are described in a number of issued patents including the following.

U.S. Pat. No. 3,404,706 discloses raceways having a rectangular shaped channel formed base having sidewalls with reversibly bent in-turned ends to engage a cover. Corner or end fittings are secured to the raceways by separate couplings which are screwed both to the raceways and the fittings. Mounting plates for receptacles, switches and other wiring devices are clamped to the base between covers to prevent removal by an outward force. A cover section joint-shielding member for providing complete shielding against outside interference has a shield plate having a greater width than the supporting strap to which it is attached to provide complete shielding when the shield plate is snapped in place to a raceway base between adjacent cover sections.

U.S. Pat. No. 4,360,705 discloses a corner fitting for an aluminum raceway system having two isolated wiring compartments in which telephone wiring and electrical power can be channeled to office work stations. A continuity coupling is secured by screw fasteners between the corner fitting and upstream and downstream raceways.

U.S. Pat. No. 4,017,137 discloses an electrical raceway having a channel-shaped cover having parallel sidewalls extending for cooperating interlocking engagement with the raceway base and a plurality of receptacles mounted in the cover. Ribs on opposite sides of the receptacle engage accurate projections on the cover sidewalls to retain the receptacles in assembly with the cover.

Conventional metal raceways normally comprise an aluminum raceway base to which an aluminum cover is snap-fitted. Separate compartments extending longitudinally in the raceway can be defined by separate snap-fit or screw down dividers or by divider walls extending from the base of the raceway. Although the cover extends along the majority of the length of a conventional raceway, some provision must be made to provide an interface between the wires in the raceway and external components. Conventional raceway assemblies include covers with duplex receptacle cutouts and covers having communication or data cutouts. Normally the cutouts for either duplex power receptacle or for communications in data outlets, such as modular telephone jacks, are positioned in alignment with the appropriate compartment, either at the top or the bottom of the raceway obtaining the corresponding electrical cable. Generally the cutouts in outlet cover plates are offset because applicable safety standards require that separate compartments containing different conductors must be separated, for example power conductors must be isolated from data conductors. Although either power, data or telephone outlets could be located at any axial position along the raceway, the height of conventional receptacle cutouts are still different, thus resulting in an unaesthetic appearance.

The instant invention provides an outlet receptacle which can be used on a surface mounted raceway or can be used on a raceway which is recessed into a groove along a wall, and permits individual receptacle outlets to be located at the center of the raceway. Thus receptacles for power, receptacles for communication cables, and receptacles for data can all be positioned in the center of the raceway.

SUMMARY OF THE INVENTION

This invention relates an outlet cover or receptacle outlet housing for use with an electrical channel such as a raceway which may contain at least two longitudinally extending compartments. This outlet cover or receptacle outlet housing comprises a unitary enclosure member or bracket having a front wall and a rear wall. Receptacles or connectors such as duplex receptacles or modular telephone jacks may be secured to the front wall of the unitary enclosure member or bracket. The rear wall of the unitary enclosure member or bracket has a slot extending between opposite ends which provides access to the interior of the unitary enclosure member or bracket. This slot provides access to longitudinally extending compartments in a raceway or channel so that an interconnection can be made to conductors in the channel. When the outlet cover or receptacle outlet housing of this invention is employed with a raceway or channel having multiple compartments the slot in the rear wall will be in alignment with one compartment. The remainder of the rear wall will cover the other compartment to isolate the other compartment from the interior of the outlet cover or receptacle outlet housing. Thus where interconnection is to be made with conductors in a compartment located at the top of a raceway, the slot in the rear wall will be located along the top of the rear wall. Conversely where interconnection is to be made with a lower compartment the slot in the rear wall will communicate with the lower compartment. The electrical receptacles or connectors used to provide an external interface in the outlet cover or the receptacle outlet housing are however positioned in the center of the outlet cover or receptacle outlet housing and will generally overlap at least two compartments in the raceway.

In the preferred embodiment of this invention the outlet cover or receptacle outlet housings can be secured to the front of the raceway in much the same manner as a cover extending along the majority of the length of the raceway, would be attached. In the preferred embodiments of this invention the receptacle housing is merely snap-fit on the top and bottom walls of the raceway housing. In the preferred embodiments of this invention the outlet cover or receptacle housings are formed of a metallic member having a generally uniform cross section with the exception of openings in the front wall. In these embodiments the ends of this metallic member are open. End caps, which may be insulative are secured to the ends of these metallic members to fully enclose the interior of the receptacle outlet housings. End caps which can engage outlet housings on opposite sides can be employed so that electrical outlets for different connectors or receptacles can be located side-by-side.

BRIEF DESCRIPTION OF THE DRAWINGS

FIG. 3 is an exploded view showing components of side-by-side power outlets and communication outlets which may be used with a surface accessible raceway or a raceway extending along the surface of a wall or partition.

FIG. 5 is an exploded view showing the components of a power and communication outlet which could be mounted to a raceway installed on the surface of a wall or partition. The raceway configuration of FIG. 5 differs from that shown in FIG. 1 and demonstrates the fact that outlets in accordance with this invention can be employed with a number of different basic raceway systems.

DETAILED DESCRIPTION OF THE PREFERRED EMBODIMENT

The electrical distribution assembly 2 comprising the preferred embodiment of this invention includes a raceway 4 containing power conductors 6 and telephone conductors 8 in separate compartments. Access to both the power conductor 6 and the telephone conductors 8 can be established at any point along the length of the raceway by employing a two piece outlet cover 10. The raceway 4 comprises an electric channel having two separate compartments, a power conductor compartment 12 and telephone conductor compartment 14. The two compartment raceway 4 shown with the preferred embodiments of this invention is intended to be illustrative only. One of ordinary skill in the art would recognize that additional compartments, such as a data conductor compartment could be employed or raceways having different arrangements of conductor compartments could be used with the outlet cover 10 depicted herein.

Figure 1:
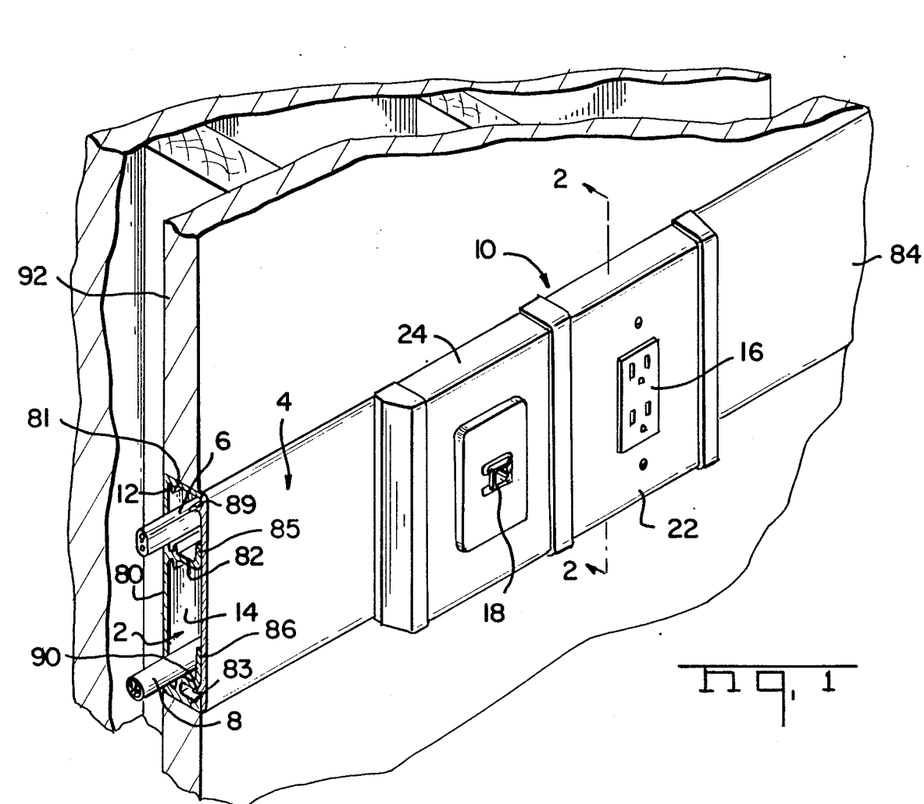
FIG. 1 is a view of a surface accessible raceway showing a modular telephone jack and a duplex power receptacle each centrally positioned on the raceway.

In the embodiment of the invention shown in FIG. 1, interconnection can be provided between power conductors 6 and a conventional duplex outlet receptacle 16. Interconnection of telephone conductors 8 in the lower compartment can be made to a modular telephone jack 18 located in an outlet cover which is positioned beside the outlet cover containing the duplex outlet 16. Interconnection of the telephone conductors 8 to the modular telephone jack 18 can be made by the use of a conventional modular telephone plug 20 secured to the ends of the telephone conductors 8.

Each outlet cover or receptacle housing forming the preferred embodiment of the invention has a one-piece bracket or enclosure member with insulative end caps secured thereto to completely enclose the interior thereof. The one-piece brackets or enclosure members 22 and 24 are each shown in FIG. 3. In the preferred embodiment of this invention, each of these brackets is metallic. Brackets of this form can be extruded from a metal such as aluminum since the cross section of the brackets remains generally constant, with the exception of openings of the front and rear wall which can be punched. Two types of insulative end caps can be employed. The standard end caps 26 can be mounted on opposite ends of a bracket to fully enclose a single bracket. Where two outlet housings are to be positioned side-by-side, a two sided end cap 28 would be employed.

The one piece bracket 30 of the power receptacle housing 26 has a front wall 32 and a back wall 34. A top wall 36 and a bottom wall 38 join the front wall and back walls 32 and 34 and extend between opposite ends of power bracket 30. Mounting ribs 40 and 42 are located on the rear wall 34 adjacent the top and bottom walls 36 and 38. A generally rectangular wire access slot 44 located generally along the top of the rear wall 34 of power bracket 30 extends between two stiffening ribs 45 on opposite ends of bracket 30.

Stiffening ribs 45 are located along opposite ends of the bracket and the wire access slot 44 is relatively large so that wires or pigtails can be easily fed from the interior of the bracket to the raceway compartment containing cable wires. Stiffening ribs 45 reinforce the mounting ribs 40, 42 to secure the bracket in engagement with the housing. The brackets can be removed by prying them loose with a tool, such as a screwdriver, but the brackets cannot be inadvertently pulled off the raceway. A generally rectangular opening 46 is formed in the center of the front wall 32 of power bracket 30. This rectangular opening is sized to receive the front face of a duplex power outlet 16. It should be understood that the opening 46 can be sized to correspond to the configuration of the front face of any standard power receptacle, either a simplex receptacle or a duplex receptacle. Screw holes 48 are machined into the front wall 32 in position to engage and secure the duplex power receptacle 16 to the front wall of bracket 30.

The telephone bracket 50 is in many respects similar to the power bracket 30. Telephone bracket 50 can also be extruded from a metal such as aluminum and has a front wall 52 parallel with a back wall 54. The front and back are rear walls 52 and 54 are joined by top walls 56 and 58 in much the same manner as with the power bracket 30. Mounting ribs 60 and 62 are similarly positioned along the rear wall 54 adjacent to top wall 56 and bottom wall 58. A wire access cutout slot 64 extends generally along the lower portion of the rear wall 54, again of the telephone bracket 50. A generally rectangular opening 66 is located in the central portion of the front wall 52. It should be understood that the elevation centerline of the opening 66 is specifically intended to be the same as the opening 46 defined in the front wall of the power bracket 30. The rectangular shape of the opening 66 in telephone bracket 50 is intended to coincide with a rectangular plastic cover in which modular telephone jack 18 is positioned. It should be understood that other types of connectors could be used with covers which would snap into openings 66. This plastic cover can have conventional plastic latches along the side so that the plastic cover containing the modular telephone jack 18 can merely be snapped into the opening 66 in the telephone bracket 50.

Openings 46 and 66 can be dimensioned so that only one type of connector can be received within each opening. In other words a power connector could be inserted into opening 46 in the power bracket 30, but not into opening 66 in a data bracket 50. Therefore, cross wiring of the raceway would be impossible.

The open ends of the power bracket 30 in the telephone bracket 50 are closed by using insulative end caps such as the standard end cap 26 and the double sided end cap 28. The conventional single sided end cap 26 has an end wall 74. The two sided end cap 28 has a central end wall 74'. Each end cap has an outer lip 78 located around the periphery of the end cap and an inner lip 76 spaced from the end cap outer lip 78 by a distance substantially equal to the thickness of the metal forming the power brackets 30 and the telephone brackets 50. Thus the edges of the brackets adjacent the ends can be fit with in the gap formed between the inner lip 76 and the outer lip 78. The single sided end wall end cap 26 has inner and outer lip 76s and 78 extending only from one side of an end wall 74. The double sided 74' has inner lips 76 and outer lips 78 extending from opposite sides thereof.

Unlike conventional outlet covers, the preferred embodiment of this invention is fabricated by first attaching the receptacle or outlet connector, such as duplex outlet receptacle 16 or modular jack 18 to the outlet cover or receptacle outlet housing 10 before attachment thereof to the raceway or channel 4. As previously described the modular jack may be attached to the telephone bracket 50 by merely snapping in a plastic cover plate containing the electrical connector into the opening 66. The duplex receptacle 16 is assembled to the power bracket 30 in a different manner. First pig tails 72 are provided on each terminal of the duplex receptacle 16. The duplex receptacle 16 is then inserted into the interior of the power bracket 30 by sliding the receptacle 16 through the open ends of the power bracket 30. Receptacle 16 can then be slid into position within the opening 46 and conventional screws may be used to secure the outlet receptacle 16 to the front wall 32 of power bracket 30. Once the outlet connectors are secured to the front wall of the power brackets, the outlet receptacle housings can be secured to the front of a raceway.

Figure 2:
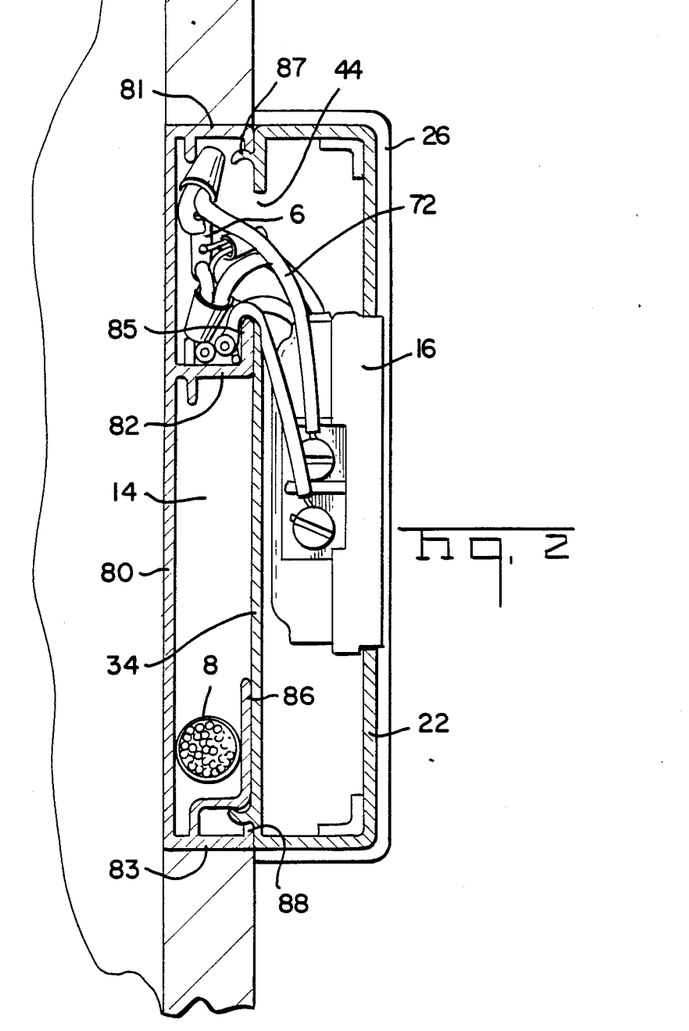
FIG. 2 is a section view taken along the lines 2—2 in FIG. 1 showing interior compartments of a surface accessible raceway with conductors extending into a duplex power receptacle outlet.

In the embodiment of FIGS. 1-4, the power receptacle outlet housing 22 and the telephone receptacle outlet housing 24 can be secured to the raceway in the following manner. In this embodiment the raceway has a back panel 80 from which an internal raceway center panel 32 extends to define an upper compartment containing power conductor 6 and a lower compartment containing telephone connectors 8. A front panel 84 secured to the raceway back panel 80 over the majority of the length of the raceway. Where an outlet is to be positioned on the raceway the front panel 34 is cut to length to leave an opening into both longitudinally extending compartments of the raceway 4. At this point either a single outlet housing or a pair of side-by-side outlet housings can be attached to the raceway 4. When a power receptacle outlet housing 22 is to be secured, the pig tail wire 72 are secured to the power conductor which are disposed within the power conductor compartment 12. As shown in FIG. 2, conventional wire nuts can be used to secure the pigtail wires 72 to the power conductors. It should be understood that other means can be employed to make this splice interconnection. This interconnection can be easily made since the pigtail 72 will extend through the slot 44. The telephone conductor compartment 14 is however completely isolated from the interior of the power receptacle outlet housing 22 since the rear wall 34 completely encloses the telephone conductor compartment 14.

Figure 4:
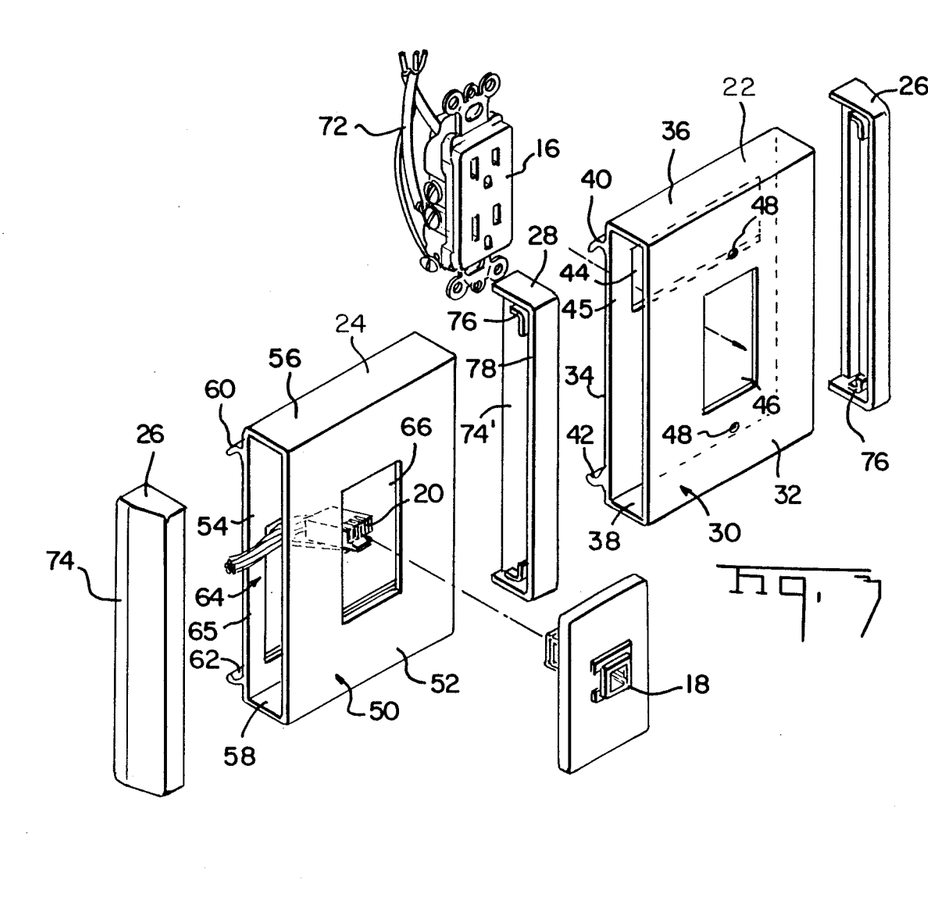
FIG. 4 is a section view taken from the rear of the raceway power and telephone outlets showing the manner in which cable compartments are covered at the rear of an outlet.

A telephone receptacle outlet housing 24, having a modular jack attached to the front wall, can also be secured to the raceway in a similar fashion. Normally a conventional modular telephone plug 20 will be attached to the ends of the telephone wires and this modular telephone plug can be inserted into the modular telephone jack 18 after the telephone conductors 8 are fed through the slot 64 in the rear wall 54. As shown in FIG. 4 the conductors in compartments which must bypass a respective outlet housing are covered by the rear wall 34 and 54 in the corresponding outlet housing 22 and 24. After the brackets 30 and 50 have been secured to the raceway back wall 80 by engagement of mounting ribs 40, 42 and 60, 62, the end caps 26 and 28 can be attached to brackets 30 and 50 to completely enclose the interconnection on the interior thereof.

Figure 6:
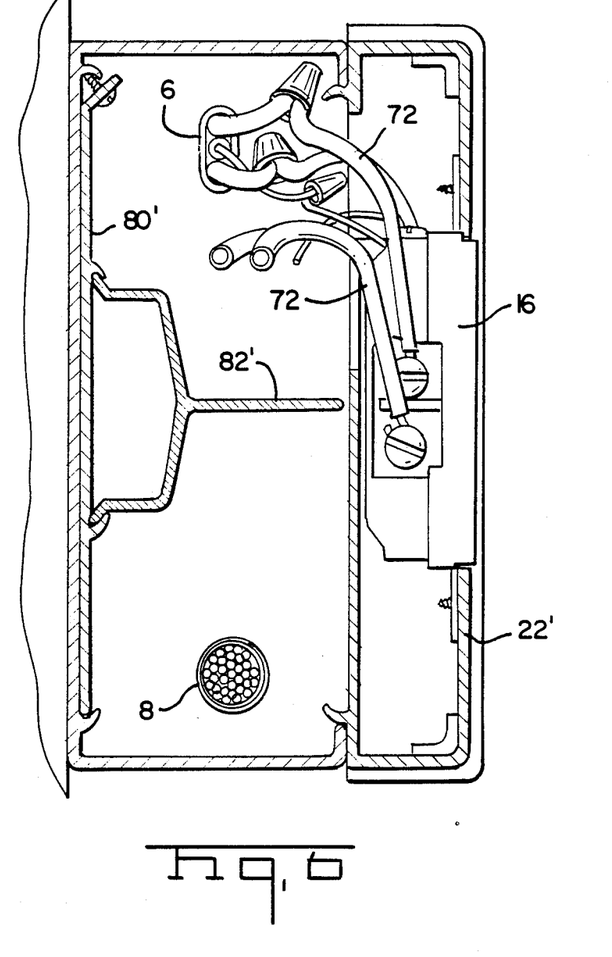
FIG. 6 is a section view showing a power receptacle outlet used within the body of raceway shown in FIG. 5.
Figure 7:
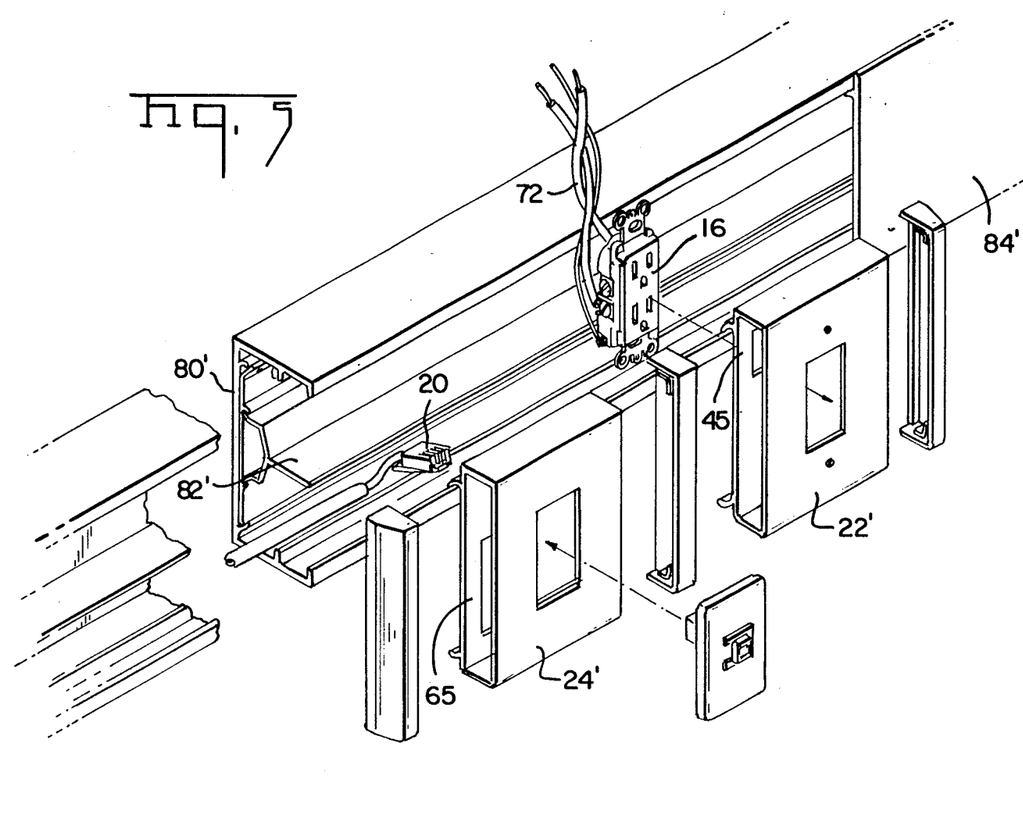

Receptacle housings such as power receptacle housing 22 and telephone receptacle housing 24, can be employed with other raceway configurations such as the alternate embodiments of FIGS. 5 and 6. It should be understood that the dimensions of the receptacle housing 22 and 24 may need to be altered when employed with other raceways, but the operating principles are similar. The alternate raceway shown in FIGS. 5 and 6 comprises a raceway back panel 80' to which a raceway center panel or divider 82' is attached to divide the raceway of the embodiments of FIGS. 5 and 6 into two longitudinal compartments. Receptacle outlet housing 22' and 24 primed are attached to the raceway back panel 80' at cut outs within the raceway cover 84' in much the same manner as for the embodiment of FIGS. 1-4. Therefore the receptacle covers or housings and the raceways depicted in the preferred embodiment of this invention are illustrative only and do not comprise the only structures which would incorporate the invention as claimed herein.

We claim:

1. An outlet cover for use with an electrical channel comprising:
   - a one-piece enclosure member having a front wall and an rear wall joined by bottom and top walls, the enclosure member being open on both ends,
   - the front wall having an opening spaced from the ends of the front wall,
   - the rear wall having a wire access slot comprising a cutout, the rear wall having mounting means located on the exterior of the rear wall protruding beyond the wire access slot, the mounting means comprising means for attaching the enclosure member to the electrical channel with the rear wall in front of the electrical channel and comprising a part of the one-piece enclosure member, whereby an outlet can be positioned in the opening in the front wall with conductors extending through the cutout in the rear wall into the electrical channel.

2. The outlet cover of claim 1 wherein the mounting means comprises ribs extending between the ends of the rear wall.

3. The outlet cover of claim 1 further including end caps mountable on the ends of the enclosure member.

4. The outlet cover of claim 3 wherein the unitary enclosure member comprises a metal member and the end caps comprise insulative members.

5. The outlet cover of claim 4 wherein the end caps each have an end wall with an outer lip and an inner lip spaced therefrom by a distance such that a portion of the front wall can be inserted between the lips to secure each end cap to the enclosure member.

6. The outlet cover of claim 5 wherein the inner lip is located at a corner of the end cap so that a portion of the upper or lower wall in addition to a portion of the front wall can be inserted between the lips.

7. The outlet cover of claim 5 wherein at least one of the end caps has inner and outer lips on opposite sides of the end wall so that two enclosure members can be secured thereto.

8. The outlet cover of claim 1 wherein the shape of the opening in the front wall conforms to the periphery of the outlet.

9. The outlet cover of claim 8 wherein the rear wall is spaced from the front wall by a distance substantially equal to the depth of the outlet.

10. The outlet cover of claim 9 wherein the outlet can be secured tot he front wall of the enclosure member.

11. A receptacle outlet housing for use with an electrical raceway containing at least two longitudinally extending compartments, the receptacle outlet housing comprising: a bracket having a front wall and a rear wall, the front wall having an opening in the center of the bracket in which an electrical outlet can be positioned with the electrical outlet being centrally positioned between the two longitudinally extending compartments, the rear wall having a wire access slot at least partially offset from said opening in the front wall, and mounting means for attaching the bracket to the front of the raceway so that the rear wall covers at least one longitudinally extending compartment in the raceway and with the slot being aligned with another of the longitudinally extending compartments.

12. The receptacle outlet housing of claim 11 wherein stiffening ribs are located along the ends of the rear wall on opposite sides of the wire access slot.

13. The receptacle outlet housing of claim 12 wherein end caps are attached to the ends of the bracket.

14. The receptacle outlet housing of claim 13 wherein at least one of the end caps comprises means on opposite sides of an end wall thereof securable to said two brackets, whereby the brackets can be mounted side by side on the same raceway.

15. The receptacle outlet housing of claim 11 wherein the front wall is joined to the rear wall by a top wall and a bottom wall.

16. An assembly for use with electrical conductors, comprising:
a raceway having first and second longitudinally extending compartments;
first and second electrical outlets, the first outlet being connectable to electrical conductors in the first compartment, the second outlet being connectable to electrical conductors in the second compartment;
first and second receptacle housings mountable on the raceway at locations in which the front of the raceway is open, the first outlet receptacle housing having a rear wall configured to cover the front of the second compartment, the second outlet receptacle housing having a rear wall configured to cover the front of the first compartment, the raceway compartments each having an open front communicating with the interior of the respective outlet receptacle housing to permit interconnection of the electrical conductors in each of the raceway compartments with a corresponding one of the electrical outlets located in the interior of the respective outlet receptacle housing.

17. The assembly of claim 16 wherein each of the outlet receptacle housings includes means for mounting the corresponding electrical outlet in a position overlapping the first and second raceway compartments so that the first and second outlets may each be mounted at the same height on the raceway.

18. The assembly of claim 17 wherein each outlet receptacle housing has a front wall, with means for mounting the corresponding outlet receptacle being located on the front wall of each of the outlet receptacle housings.

19. The assembly of claim 18 wherein each of the outlet receptacle housings has open ends, the assembly further comprising end caps attachable to the open ends of the outlet receptacle housings.

20. The assembly of claim 19 wherein at least one of the end caps includes means attachable to first and second outlet receptacle housings so that the first and second outlet receptacle housings can be positioned side by side with the first and second outlets being positioned side by side.

21. The assembly of claim 20 wherein the first outlet comprises a duplex house wiring outlet and the second outlet comprises a modular telephone jack.

22. The assembly of claim 21 wherein the duplex house wiring outlet has pigtail wires attached to terminals therein, the pigtail wires being attachable tot he electrical conductors in the first raceway.

23. The assembly of claim 22 wherein a modular telephone plug interconnects the electrical conductors in the second raceway with the modular telephone jack.

24. The assembly of claim 19 in which each of the outlet receptacle housings comprises an integral enclosure bracket having top and bottom walls joining the front and rear walls.

25. The assembly of claim 18 wherein the means for mounting each of the outlets in the corresponding outlet receptacle housing comprises an opening in the front wall thereof.

26. A subassembly for use with an electrical channel comprising:
a one-piece enclosure member having a front wall and a rear wall joined by bottom and top walls, the enclosure member being open on both ends,
the front wall having an opening spaced from the ends of the front wall,
the rear wall having a wire access slot comprising a cutout, the rear wall having mounting means located on the exterior of the rear wall protruding beyond the wire access slot, the mounting means comprising means for attaching the enclosure member to the electrical channel with the rear wall in front of the electrical channel and comprising a part of the one-piece enclosure member, and an outlet securable in the opening in the front wall; the cutout being positioned in the rear wall to provide access for conductors extending from the outlet into the electrical channel.

27. A receptacle outlet housing for use with an electrical raceway containing at least two longitudinally extending compartments, the receptacle outlet housing comprising: a bracket having a front wall and a rear wall, the front wall having an opening in the center of the bracket, an electrical outlet in the opening centrally positioned between the two longitudinally extending compartments, the rear wall having a wire access slot at least partially offset from said opening in the front wall, and mounting means for attaching the brackets tot he front of the raceway so that the rear wall covers at least on longitudinally extending compartment in the raceway and with the slot being aligned with another of the longitudinally extending compartments.

* * * * *